July 26, 1966  D. B. BALLANTYNE  3,262,725
VEHICLE BODY LATCH DEVICE
Filed Aug. 19, 1963
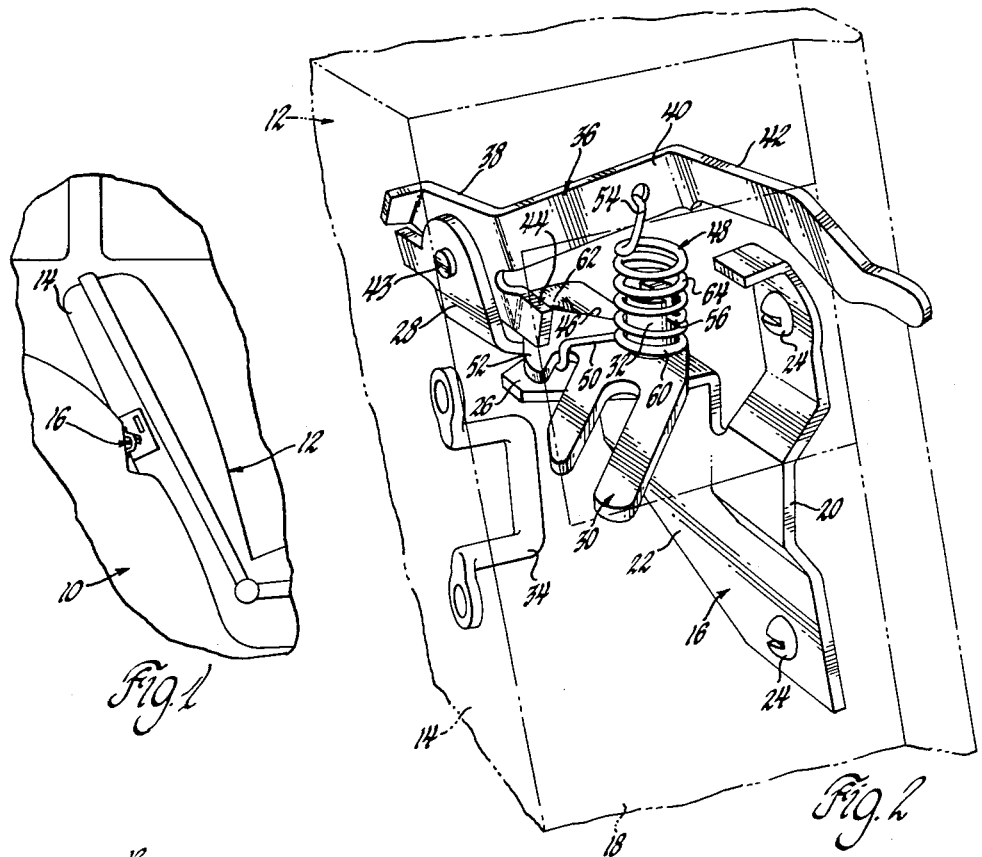
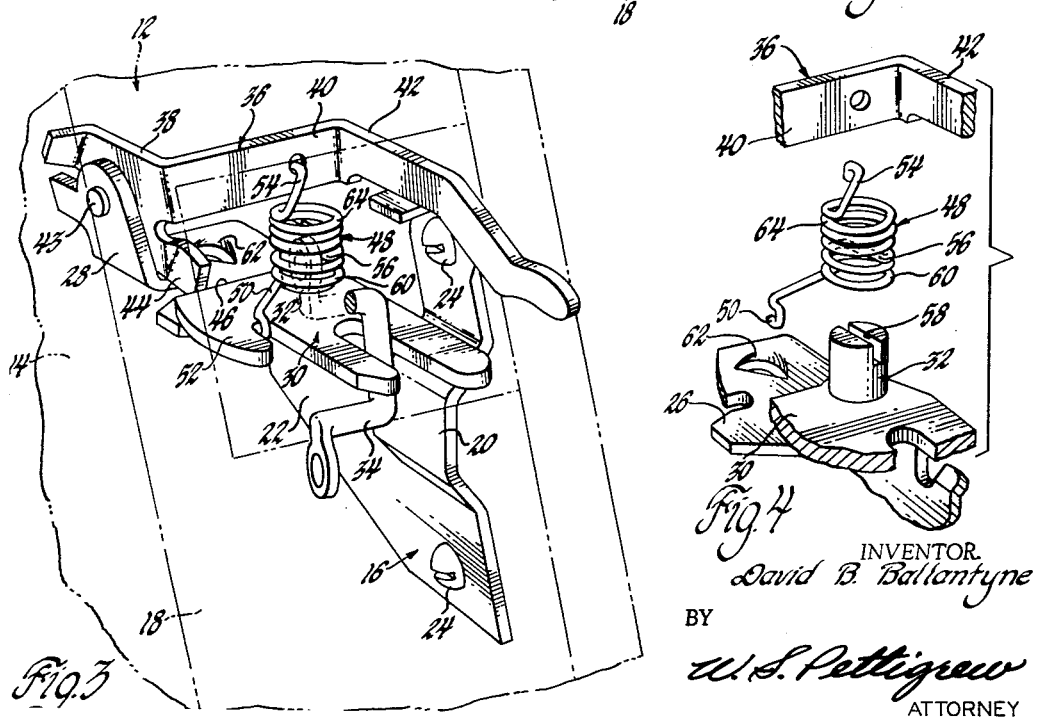
INVENTOR.
David B. Ballantyne
BY
W. S. Pettigrew
ATTORNEY

United States Patent Office 3,262,725
Patented July 26, 1966

3,262,725
VEHICLE BODY LATCH DEVICE
David B. Ballantyne, Southfield, Mich., assignor to General Motors Corporation, Detroit, Mich., a corporation of Delaware
Filed Aug. 19, 1963, Ser. No. 302,799
3 Claims. (Cl. 287—189.35)

This invention relates to latches and more particularly to vehicle body latches.

One feature of this invention is that it provides a vehicle body latch having a latch member movable between latched and unlatched positions, a detent member movable between holding and released positions, and a single spring having two operative portions, one portion functioning as a tension spring and connected to one of the members, and the other portion functioning as a torsion spring and connected to the other member. Another feature of this invention is that it provides a vehicle body latch having a latch frame, a latch member pivotally mounted on the frame by a pivot stud, a detent member pivotally mounted on the frame, a helical spring received on the latch member pivot stud and connected between the latch and detent members, and means securing a portion of the spring to the latch member pivot stud to provide a first torsionally operative spring portion biasing the latch member into unlatched position and a second spring portion operative in tension to bias the detent member into holding position.

These and other features and advantages will be readily apparent from the following specification and drawings wherein:

FIGURE 1 is a fragmentary elevational view of a vehicle body embodying a latch device according to this invention;

FIGURE 2 is an enlarged perspective view of a portion of FIGURE 1 showing the latch in unlatched condition;

FIGURE 3 is a view similar to FIGURE 2 showing the latch in latched condition; and FIGURE 4 is an exploded perspective view.

Referring now particularly to FIGURE 1 of the drawings, a vehicle body 10 is provided with a passenger seat 12, the seat back 14 of which is movable between an upright position as shown, and a folded position or stowed position, not shown. A latch device 16 according to this invention is provided to secure seat back 14 in upright position.

As shown in FIGURES 2 and 3, latch 16 is mounted within the seat back adjacent the side wall 18 thereof and includes a latch frame or bracket 20 having a base portion 22 secured by screws 24 to the seat back, a lateral flange 26, and a flange 28 bent upwardly from flange 26. A forked bolt 30 is pivotally mounted on flange 26 by a stud 32. Bolt 30 is movable between an unlatched position as shown in FIGURE 2, and a latched position as shown in FIGURE 3, wherein the bolt engages a striker bar 34 mounted on a body member adjacent the wall 18 of seat back 14 to hold the seat back in upright position.

A bolt holding and releasing member or detent 36 includes a first arm 38, a second right angularly bent arm 40 and an arm or handle portion 42 projecting through side wall 18 of the seat back. Detent 36 is pivotally mounted at 43 on flange 28 for movement between a holding position as shown in FIGURE 3, wherein a leg 44 of the detent engages an edge 46 of bolt 30 to hold the bolt in latched position, and a releasing position as shown in FIGURE 2, wherein leg 44 engages the upper surface of bolt 30 when the bolt is in unlatched position.

Means for biasing the detent to holding position and for biasing the bolt to unlatched position comprise a single helical spring 48 received over the stud 32. One end 50 of the spring is hooked to a finger 52 of the bolt and the other end 54 of the spring is hooked to the arm 40 of the detent. An intermediate convolution of the spring is provided with a straight diametrically disposed leg 56 which is received in a diametrical slot 58 of stud 32 to provide the spring with a lower torsionally operative spring portion 60 and an upper tension portion 64. Portion 64 biases detent 36 downwardly and portion 60 is loaded when the bolt is in latched position so as to bias the bolt toward unlatched position, the leg 44 of the detent thus normally engaging with the upper surface of the bolt. A lanced out stop 62 in flange 26 locates the bolt against the action of portion 60 so that the bolt is engageable with striker 34 during movement of the seat back toward upright position. When the seat back reaches upright position the bolt is fully rotated into latched position, and leg 44 is urged to engage behind edge 46 of the bolt so that the seat back is secured in upright position.

Thus a new and improved vehicle body latch device is provided.

I claim:

1. In a vehicle body latch device, the combination comprising, a latch frame, a latch bolt member mounted on said frame for movement between latched and unlatched positions, a bolt-holding member mounted on said frame for movement between holding and released positions, elongate longitudinally flexible resilient means connected between said members, and means anchoring an intermediate portion of said elongate means on said frame to provide said elongate means with a first longitudinally resilient portion and a second torsionally resilient portion, means operatively connecting said first portion to one of said members to urge said one member to one of said positions thereof, and means operatively connecting said second portion to the other of said members to urge said other member to one of said positions thereof.

2. In a vehicle body latch device, the combination comprising, a latch frame, a latch bolt pivotally mounted on said frame for generally planar movement between latched and unlatched positions, a bolt-holding member pivotally mounted on said frame for movement in a plane generally normal to the plane of movement of said bolt between holding and released positions, a helical spring connected at one end thereof to said bolt and connected at the other end thereof to said holding member, and means securing an intermediate convolution of said spring to said frame and providing a first resilient portion torsionally flexible to urge said bolt to unlatched position and a second resilient portion axially flexible to urge said holding member to holding position.

3. In a vehicle body latch device, the combination comprising, a latch frame including an elongated pivot stud, a latch bolt pivotally mounted on said pivot stud for generally planar movement between latched and unlatched positions, a bolt-holding member pivotally mounted on said frame for movement in a plane generally normal to the plane of movement of said bolt between holding and released positions, a helical spring received over said pivot stud, said spring being connected at one end thereof to said bolt and connected at the other end thereof to said holding member, and means securing an intermediate convolution of said spring to said pivot stud and providing a first spring portion operative in tension to bias said holding member to holding position and a second spring portion operative in torsion to bias said bolt toward unlatched position.

References Cited by the Examiner
UNITED STATES PATENTS 3,010,749   11/1961   Brissette et al. _____ 292—27

FRANK L. ABBOTT, *Primary Examiner.*

RICHARD W. COOKE, Jr., *Examiner.*

R. S. VERMUT, *Assistant Examiner.*